United States Patent [19]

Litz

[11] 4,017,755
[45] Apr. 12, 1977

[54] FLUID-COOLED ROTATING MEMBER WITH IMPROVED COOLANT EXHAUST STRUCTURE SUITABLE FOR SUPERCONDUCTING DYNAMOELECTRIC MACHINERY

[75] Inventor: Donald C. Litz, Monroeville, Pa.
[73] Assignee: Westinghouse Electric Corporation, Pittsburgh, Pa.
[22] Filed: Oct. 31, 1974
[21] Appl. No.: 519,725

Related U.S. Application Data
[63] Continuation of Ser. No. 263,039, June 15, 1972.
[52] U.S. Cl. .............................. 310/40 R; 310/52
[51] Int. Cl.² .......................................... H02K 9/00
[58] Field of Search ............... 310/52, 40, 64, 10, 310/54

[56] References Cited
UNITED STATES PATENTS
3,657,580  4/1972  Doyle ................................. 310/52
3,665,229  5/1972  Lorch ................................. 310/52
3,809,933  5/1974  Sugawara ........................... 310/52

Primary Examiner—J. D. Miller
Assistant Examiner—Robert J. Hickey
Attorney, Agent, or Firm—G. H. Telfer

[57] ABSTRACT

In a fluid-cooling rotating member, such as a dynamoelectric machine rotor with superconducting windings, the fluid exhaust is used to cool structural members connecting ambient and cool zones in order to minimize heat flow to the cold elements. The coolant in the exhaust structure is confined to a path along the axis of rotation. This avoids radial coolant flow paths and radially displaced coolant flow paths in order to eliminate convection currents. The axially located coolant conduit is surrounded by and spaced from a supporting sleeve with a plurality of thermally conductive members extending between the coolant conduit and the supporting sleeve through an evacuated volume at axially spaced intervals.

5 Claims, 2 Drawing Figures

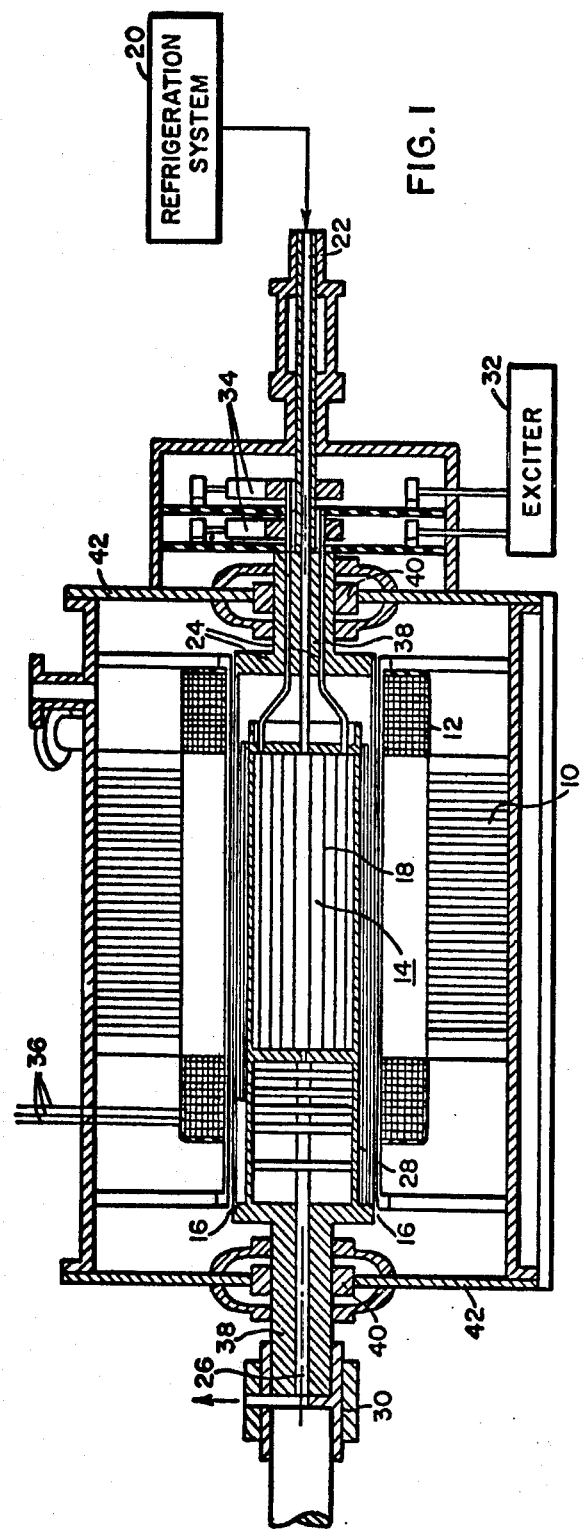
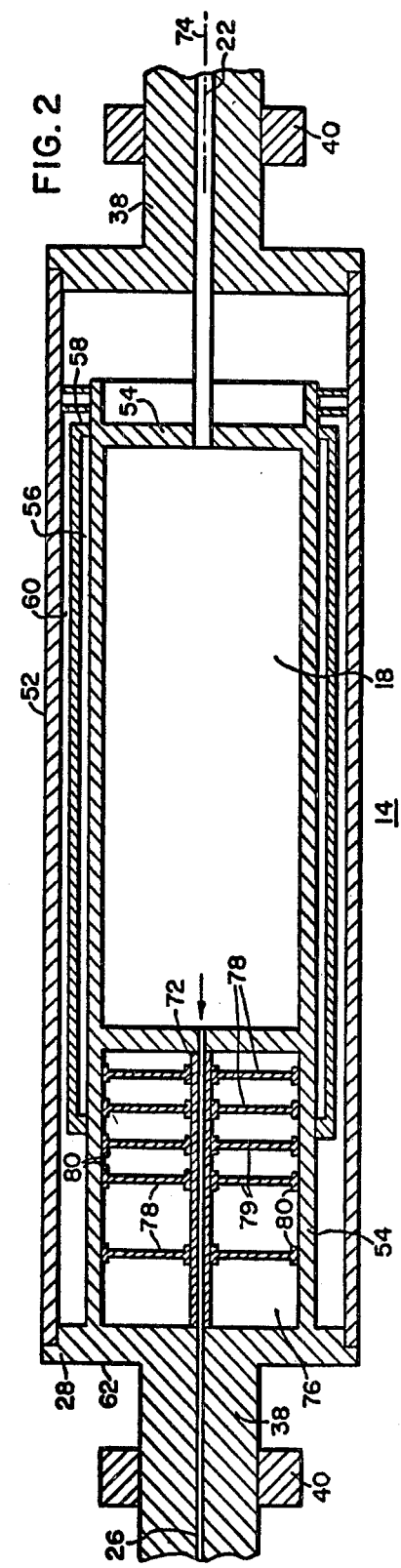

FLUID-COOLED ROTATING MEMBER WITH IMPROVED COOLANT EXHAUST STRUCTURE SUITABLE FOR SUPERCONDUCTING DYNAMOELECTRIC MACHINERY

This is a continuation of application Ser. No. 263,039 filed June 15, 1972.

BACKGROUND OF THE INVENTION

The invention relates generally to fluid-cooled rotating members and particularly to dynamoelectric machines having a rotor with superconducting windings.

General concepts for superconducting dynamoelectric machines are known and are of growing interest because of the need to maximize machine efficiency and reduce the size of machines of given ratings. One area of interest is the application of superconducting technology to alternating current generators. In one form, such a generator consists of a stator with a conventionally conductive armature winding and a rotor with superconducting field coils or windings. To attain superconductivity in available conductors, such as those consisting of niobium and titanium alloy, requires that the maximum winding temperature be about 9° to 11° K. To achieve such temperatures, a cryogenic coolant, such as liquid helium having a temperature of 4.2° K, is circulated in intimate thermal relation with the conductors of the windings. Such a coolant is expensive and the thermal margin between the coolant temperature and the critical temperature of the superconductive winding is relatively small so that important design criteria are to minimize the use of coolant and to minimize heat conduction into the winding from external structural elements that may be at or near ambient temperature.

Previously proposed arrangements for a rotor with superconducting windings contemplate placing the rotor windings inside a torque tube within a dewar type vessel to minimize heat transfer. The structural elements at the periphery of the tube support the field poles and windings and transmit machine torque to a shaft and rotor drive coupling. Such structural elements can cause a large heat conduction into the cold region. One such machine of the prior art is that disclosed in *Analysis of the Application of Superconductivity to Commercial Electric Power Generation* by P. Thullen, a doctoral thesis at the Massachusetts Institute of Technology, dated June, 1969. In accordance with this publication, the conduction heat losses from the periphery of the torque tube are intended to be reduced by passing the coolant exhausted from the field winding over, through or in contact with the support structure. Because the support structure is rotating, and the coolant is therefore rotating, body forces exist in the coolant that cause convection currents to flow in the structural cooling passages. These convection currents tend to equalize the coolant temperature in the structure thus increasing heat flow to the low temperature region of the machine. The convection currents are proportional to the rotational speed, the distance from the axis of rotation and the differences that occur in coolant density as a result of rotation.

The above referred to thesis recognizes the occurrence of convection currents and intends to avoid them by placing baffles in the exhaust coolant passages. This expedient, and others for avoiding convection currents in the rotating coolant, is only partially successful and it is desirable to further improve the means for cooling the support structure.

SUMMARY OF THE INVENTION

In accordance with this invention, a fluid-cooled rotating member, such as a dynamoelectric machine rotor with superconducting windings, is provided with a coolant exhaust structure with features to minimize undesired heat transfer from structural members located at or near ambient temperature to the cold elements. The heat transfer is minimized by confining the exhaust coolant to a path along the axis of rotation and avoiding radial coolant flow paths and radially displaced coolant flow paths in order to eliminate convection currents. The axially located coolant conduit is surrounded by and spaced from a supporting sleeve that is part of the structure that is at or near ambient temperatures. A plurality of thermally conductive members extend between the coolant conduit and the supporting sleeve through an evacuated volume at axially spaced intervals. heat flow occurs from the support sleeve through the thermally conductive members to the coolant.

Implementation of the present invention results in a simpler structure than that previously proposed and yet one that is more effective in avoiding convection currents, since they are substantially eliminated, while improving the overall effectiveness of the cooling structure.

THE DRAWINGS

FIG. 1 is a sectional view of a dynamoelectric machine embodying the present invention; and FIG. 2 is an enlarged sectional view of a portion of the apparatus of FIG. 1.

PREFERRED EMBODIMENT

Referring to FIG. 1, a dynamoelectric machine is shown which is an A.C. generator including a stator 10 with conventionally electrically conductive (i.e., not superconductive) armature windings 12. A rotor 14 is located within the stator 10 in spaced relation and inductively coupled thereto across an air gap 16. The rotor has a field structure 18 including field windings that are fluid cooled, preferably to an extent that the field windings are superconductive.

Certain features of the machine will only be generally described herein as they may take various known forms such as are disclosed in the above-mentioned thesis by Thullen and the references cited therein.

Coolant passages are provided in intimate thermal contact with the field windings in the rotor field structure 18. Liquid helium, having a temperature of 4.2° K, may be used as the coolant to maintain the conductors of the field windings in the superconductive state. The coolant is supplied from a refrigeration system 20 external of the dynamoelectric machine, to an axially located inlet 22. The coolant circulates through the rotor 14 through the field structure 18 and also cools excitation leads 24. The coolant eventually is exhausted from an outlet port 26 at the other axial extremity of the machine, and may be recycled through system 20 if desired.

The rotor 14 is in the form of a torque tube. That is, instead of mounting field poles and their windings on a solid shaft, as is done in most conventionally conductive rotors, the field structure 18 is located inside a tube 28 of sufficient mechanical strength to transmit torque to external shaft coupled elements such as a coupling 30 and utilmately to a prime mover (not shown), such as a motor or turbine. In operation, as is well known, the driving of the rotor and the application of DC excitation to the field windings from an exciter 32 through slip rings 34 and excitation lead 24 will result in generation of AC power, in one or more phases, that is available from leads 36 and from the armature winding 12 in the stator 10.

The torque tube 28 has shaft ends 38 that are supported within bearings 40 in fixed housings 42 that also support the stationary machine elements. The housings 42 are shown with inlet and outlet ports 44 and 45 for supplying a fluid coolant to the stator 10.

The features of the rotor 14 that are of principal interest for an understanding of the present invention are shown in greater detail in FIG. 2, which is, of course, not necessarily to scale. The peripheral portion 52 of rotor 28 (e.g. of stainless steel) is necessarily relatively massive for mechanical considerations and can introduce a substantial heat loss that could endanger the superconductivity of the field windings unless suitable precautions are taken. Among those precautions is to form the torque tube 28 with a double vacuum around the cold structure 18. A vacuum enclosure, or "Dewar", for thermal insulation has been previously used on machine rotors and that shown in FIG. 2 is merely exemplary of the form it can take. The cold structure 18 is immediately supported in a tube or sleeve 54 (e.g. of stainless steel). A first evacuated space 56 surrounds sleeve 54 in the vicinity of the cold structure 18. A radiation and damper shield 58 (e.g. of copper) encloses the first evacuated space 56. A second evacuated space 60, defined by the peripheral portion 52 of the torque tube, surrounds shield 58 and the unshielded part of sleeve 54. The two vacuum layers 56 and 60 (which may be in communication with each other through minor apertures) and shield 58 can be effective to limit heat transfer radially inward from tube 52 (which is at room temperature) to the cold structure 18. However, sleeve 54 must necessarily be supported in common with sleeve 52. Thus, as shown, they are joined along radial wall 62 of the torque tube 28. Thermal conduction along sleeve 54 from the room temperature wall 62 could be fatal to superconductivity in the field windings in structure 18.

For further reduction of the temperature of the structural portion 54 of the rotor it has in the past been recognized that the coolant, after circulation among the field windings in structure 18, can be circulated through an axially adjacent portion of the rotor before being discharged from the machine. The forms in which this coolant flow through a coolant exhaust structure 70 have previously taken have been mentioned in the background discussion above. They rely on coolant circulation in direct thermal contact with structural members such as sleeve 54 with the attendant problems incurred by convection currents in the rotating coolant. It is particularly with respect to the nature of the coolant exhaust structure 70 that the present invention pertains.

In accordance with this invention the coolant exhaust structure 70 is a means for exhausting coolant from the rotating member intended to be cooled, the field structure 18 of the machine, which means confines the coolant to a path along the axis of rotation, for an axial distance in which radial coolant flow paths and radially displaced coolant flow paths are excluded to eliminate convection currents. As shown, a tubular coolant conduit 72 is positioned directly on the axis of rotation 74 and carries the coolant from the field structure 18 toward the outlet port 26. Supporting sleeve 54 surrounds and is spaced from the coolant tube 72 by an evacuated volume 76. A plurality of thermally conductive members 78, each joined to the supporting sleeve 54 and the coolant tube 72, extend through the evacuated volume 76 at axially spaced intervals.

The thermally conductive members 78 may be in the form of spokes or thin discs, preferably with minor apertures so a common vacuum can be maintained throughout the structure. The thermally conductive members 78 are of a material chosen to have a higher coefficient of thermal conductivity than the material of either of the coolant tube 72 or the supporting sleeve 54 in order to avoid heat conduction through either the coolant tube or the sleeve back to the cold structure 18. For example, it is suitable for the thermally conductive members to consist of copper and the coolant conduit 72 and the supporting sleeve 54 to both consist of stainless steel.

The thermally conductive members 78, as shown, have an intermediate portion 79 of relatively small cross-sectional area in planes perpendicular to a radius from the axis. Terminal portions 80 of the thermal conductive members 79 that are directly joined to the coolant conduit 72 and supporting sleeve 54 are of larger cross-sectional area. The terminal portions 80 act as cooling stations for efficient heat conduction between them and the adjacent elements.

The invention has been particularly described in connection with an AC generator with a superconductive rotor structurally disposed within the stator. It will be apparent that the coolant exhaust structure 70 of this invention may be applied to other fluid-cooled rotating members.

I claim:

1. In apparatus in which a fluid is used as coolant for a member rotating about an axis of rotation:
    means for exhausting coolant from the rotating member intended to be cooled, said means confining the coolant to a path along the axis of rotation for a distance in which radial coolant flow paths and radially displaced coolant flow paths are excluded to eliminate convection currents, said cooled member being supported within a substantially cylindrical supporting sleeve and said means for exhausting coolant being axially adjacent said cooled member and within said sleeve, said means for exhausting coolant comprising a tube along the axis for carrying the coolant therein said tube being spaced from said supporting sleeve by an evacuated volume, and a plurality of thermally conductive members extending between said tube and said sleeve through said evacuated volume at axially spaced intervals.

2. The subject matter of claim 1 wherein:
    said thermally conductive members are of a material having a higher coefficient of thermal conductivity than the material of said tube and the material of said sleeve;
    and said coolant is a cryogenic fluid having a temperature less than about 10° K.

3. In a superconducting dynamoelectric machine, the combination comprising:
    a stator; a rotor mounted for rotation about an axis of rotation, said rotor being spaced from and inductively coupled with said stator, said rotor including an electrical winding structure with means to cool said winding structure by a cryogenic fluid coolant sufficient to render said windings superconductive, said winding structure being supported within a supporting sleeve;

a coolant exhaust structure rotatable with said rotor and axially adjacent thereto within said sleeve, said structure including a conduit for said coolant located on said axis of rotation, and a plurality of thermally conductive members extending between said conduit and said sleeve at axially spaced intervals.

4. The subject matter of claim 3 wherein:

said conduit on said axis is the only path for coolant in said coolant exhaust structure to avoid convection currents resulting from radially displaced coolant flow;

said conduit and said sleeve are spaced by an evacuated volume through which said thermally conductive members extend;

said thermally conductive members are of a material having a higher coefficient of thermal conductivity than either of said conduit and said sleeve and each have a principal portion intermediate first and second terminal portions, which terminal portions are joined to and in thermally conductive contact with said conduit and said sleeve respectively, said terminal portions having a larger cross-section in a plane perpendicular to a radius from said axis than does said intermediate portion.

5. The subject matter of claim 3 wherein:

said machine is an AC generator with said rotor certrally disposed within said stator and said winding structure comprises field coils for DC excitation of said rotor;

said winding structure and said coolant exhaust structure are within a torque tube, said torque tube having a peripheral portion, radially spaced from said sleeve with vacuum therebetween said torque tube having shaft ends for external coupling, said peripheral portion and said sleeve being directly joined only at an end wall adjacent said coolant exhaust structure.

* * * * *